(12) United States Patent
Kuranuki et al.

(10) Patent No.: US 6,343,004 B1
(45) Date of Patent: Jan. 29, 2002

(54) SOLID ELECTROLYTIC CAPACITOR

(75) Inventors: Kenji Kuranuki, Muko; Isao Kaneko, Yahata; Takaaki Kojima, Katano; Eiji Yamashita, Neyagawa; Mikio Kobashi, Hirakata; Katsumi Uemura, Kyoto, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/383,377

(22) Filed: Aug. 26, 1999

(30) Foreign Application Priority Data

Aug. 26, 1998 (JP) .......................... 10-239789
Apr. 26, 1999 (JP) .......................... 11-117646

(51) Int. Cl.⁷ .................................. H01G 9/00
(52) U.S. Cl. .................. 361/523; 361/528; 361/540
(58) Field of Search ................ 361/523, 301.4, 361/328, 524, 528–529, 530, 531–533, 540, 541

(56) References Cited

U.S. PATENT DOCUMENTS 5,377,073 A * 12/1994 Fukaumi et al. ............ 361/540
5,660,737 A * 8/1997 Elias et al. .................... 216/6
6,081,418 A * 6/2000 Kuranuki et al. ............ 361/523

FOREIGN PATENT DOCUMENTS

JP          3-196608        *  8/1991  ................ 361/541

* cited by examiner

Primary Examiner—Anthony Dinkins
(74) Attorney, Agent, or Firm—Parkhurst & Wendel, L.L.P

(57) ABSTRACT

The present invention aims to provide a chip-type solid electrolytic capacitor of large capacitance and low ESR. An element section of the capacitor is composed of an anode oxide film layer which functions as a dielectric, a solid electrolyte layer including conductive polymer and a cathode conductive body, which are stacked on a metallic electrode. A plurality of flat capacitor elements with the element section and an anode pulling-out section are stacked, and a laminated unit is produced where the cathode conductive layer and the anode pulling-out section of the flat capacitor elements are connected to a single metallic terminal member each. The solid electrolytic capacitor of the present invention has at least two laminated units placed parallel to each other, and connected to a transversely disposed comb terminal. The construction presented by the present invention achieves a solid electrolytic capacitor of a large capacitance and a low ESR without expanding its mounting surface area.

9 Claims, 11 Drawing Sheets

SOLID ELECTROLYTIC CAPACITOR

FIELD OF THE INVENTION

The present invention relates to a solid electrolytic capacitor and production method thereof that achieves a large capacitance and a low equivalent serial resistance (hereinafter, low ESR).

BACKGROUND OF THE INVENTION

Recently, the development of smaller electronic devices used at higher frequencies has been increasing. Solid electrolytic capacitors using conductive polymers as solid electrolyte have been commercialized, as capacitors suitable for such electronic devices. Since the solid electrolytic capacitors use conductive polymers of high conductivity as solid electrolyte, they achieve high frequencies characteristics and low impedance. The ESR of these solid electrolytic capacitors is much lower than that of conventional electrolytic capacitors which use electrolytic solution as driving electrolytes and that of solid electrolytic capacitors using manganese dioxide, thereby achieving an ideally large capacitance. Since these new solid electrolytic capacitors are compact, various aspects have been improved allowing them to be gradually accepted in the marketplace.

With the development of faster and larger power consuming CPUs for computers, capacitors must achieve high frequency transient response characteristics. A large capacitance and a low ESR have also become essential characteristics. For the solid electrolytic capacitors to satisfy these demands, they need to achieve a large capacitance and low ESR while occupying the smallest possible mounting area in a device.

To realize these characteristics, techniques to laminate flat capacitor elements or thin sintered elements have been used. However, if conventional solid electrolytic capacitors are used to obtain the capacitance required to backup a CPU, five to ten large-capacitance tantalum solid electrolytic capacitors need to be mounted in parallel. Such arrangement increases the mounting area occupied by the capacitors, thus limiting the reduction of the size of the equipment.

With the increasing speed of CPUs, the amount of current flowing at high frequencies has significantly increased as well. If the ESR of a capacitor is not reduced, the temperature of the capacitor will become hot, thus increasing the chance of component break down or failure. These factors heighten the necessity to develop a capacitor of large capacitance and low ESR without increasing the size of its mounting area.

In one technique to increase the capacitance of the capacitor without expanding the size of its mounting area, a plurality of sintered elements are disposed in the same external housing and connected so as to be a single capacitor. In another technique, a plurality of flat capacitor elements are stacked to produce one solid electrolytic capacitor.

However, with the technique of using the sintered elements, there is a limitation in lowering ESR due to the resistance occurring when pulling out a cathode. Such resistance cannot be avoided since one's ability to produce thinner sintered elements is limited. The solid electrolytic capacitor made of a laminate of a plurality of flat sintered elements has problems. The number of the layers cannot be increased. Because, if there is an excessive number of layers, the sintered elements are deformed due to the difference in thickness between the anode connecting section and the cathode electric conductor laminated section, dielectric oxide films crack, and a leakage current failure occurs.

The present invention aims to provide a solid electrolyte capacitor of large capacitance and low ESR and its production method by overcoming the problems mentioned above.

SUMMARY OF THE INVENTION

The solid electrolytic capacitor of the present invention is manufactured by stacking at least two capacitor element laminated units (hereinafter, laminated unit), and connecting each electrode. In other solid electrolytic capacitors of the present invention, more than two laminated units using a conductive polymer as solid electrolyte are stacked and each electrode is connected.

ESR of the solid electrolytic capacitor of the present invention can be reduced inversely proportional to the number of the stacked laminated units. Moreover, since total capacitance of the layered capacitor elements equals the capacitance of the solid electrolytic capacitor, a large capacitance and low ESR solid electrolytic capacitor can be obtained without expanding its surface mounting area.

DESCRIPTION OF THE PREFERRED EMBODIMENTS

Preferred embodiments of the present invention are described below with reference to the accompanying drawings.

First Embodiment

Figure 1:
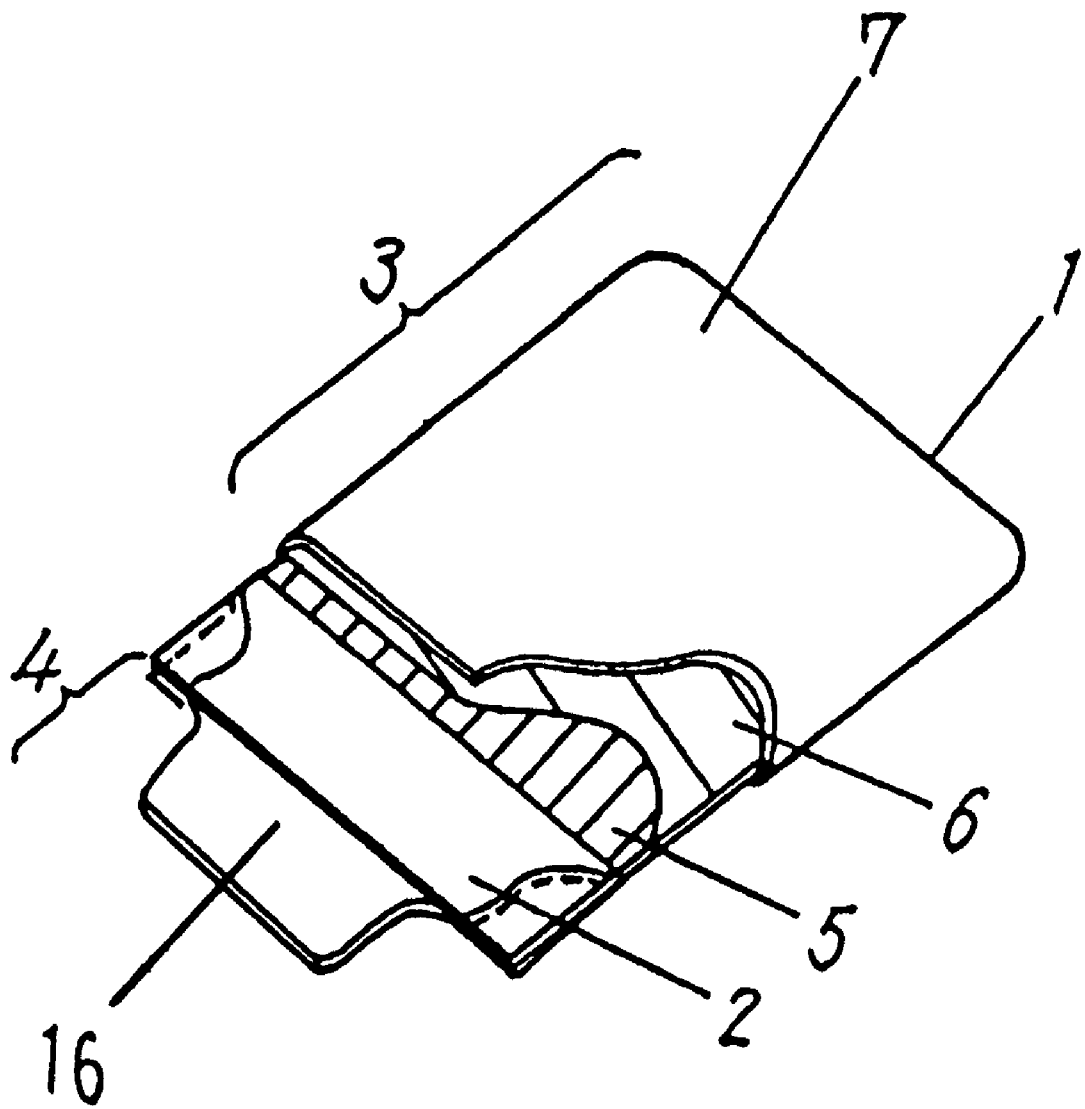
FIG. 1 illustrates a partially broken perspective view of a plate capacitor element in accordance with a first preferred embodiment of the present invention.

Aluminum foil of 99.9% purity to be used as an electrode body 16 is roughened by electrolytic etching by a known method. The aluminum foil then is anodized in a solution of 3% ammonium adipate by applying a voltage of 13 volts for 30 minutes, to form an aluminum oxide layer which functions as a dielectric. The electrode body 16 is cut 3.5 mm in width and 6.5 mm in length. Polyimide tacking tape 2 is attached on predetermined places on both sides of the electrode body 16 as shown in FIG. 1 before dividing it into an element section 3 and an anode pulling out section 4. The surface of each side of the electrode body, exposed by the cutting process, is anodized again in a solution of 3% ammonium adipate by applying a voltage of 13 volts for 30 minutes.

Subsequently, the element section 3 is dipped in a manganese nitrate aqueous solution and decomposed at 300° C. to form a conductive manganese oxide layer. The element section 3 is then dipped in a solution containing 0.1 mol of pyrrol and 0.15 mol of alkyl naphthalene sulphonic acid salt. By electrolytic polymerization, a conductive polymer layer 5 comprising polypyrrol is evenly deposited on the element section 3. The electrolytic polymerization is carried out by applying a constant voltage of 2 volts, for 30 minutes through an electrode contacted on part of the manganese oxide. A flat capacitor element 1 described in FIG. 1 is produced after carbon paste layer 6 and silver paste layer 7 are formed on the element section 3 of a capacitor element 1.

Figure 2:
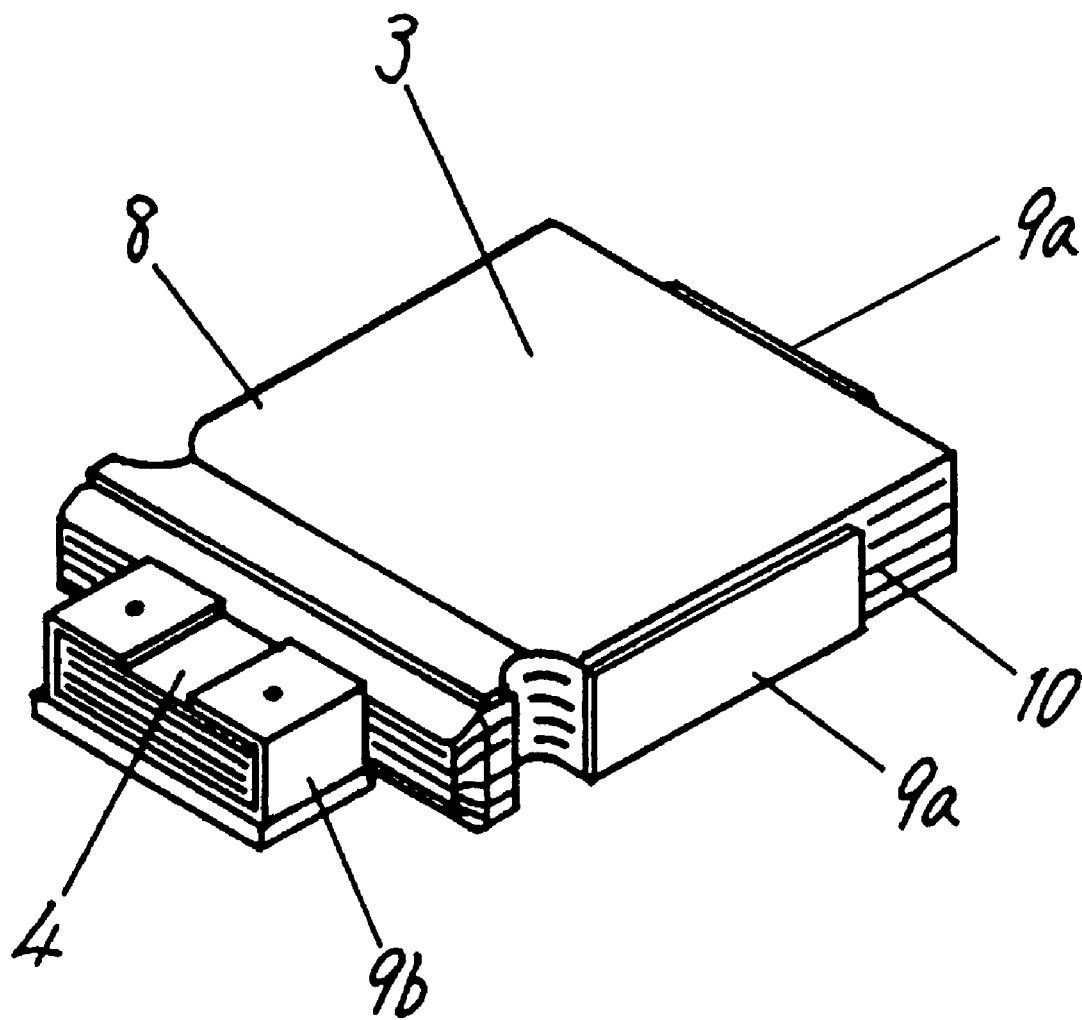
FIG. 2 illustrates a perspective view of the construction of a laminated unit in accordance with the first preferred embodiment of the present invention.

After a silver paste is painted as a conductive adhesive on the element sections 3, four pieces of flat capacitor elements 1 generated in an above-described manner are stacked in such a way that the element sections 3 as well as anode pulling-out sections 4 are facing each other respectively. And a layered element 8 is formed as shown in FIG. 2.

Metallic terminal members 9a and 9b are respectively connected to the element sections 3 and anode pulling-out sections 4 of the layered element 8. The metallic terminal member 9a has three perpendicularly standing faces arranged on the three sides of the section where the element section 3 of the plate capacitor element 1 is placed. The terminal member 9b has a section which can be fabricated to cover the anode pulling-out section 4. The element sections 3 of the layered element 8 are bonded to the terminal member 9a with silver paste. The anode pulling-out sections 4 of the layered element 8 are disposed on the terminal member 9b which has standing faces on two sides. Then, the standing faces are fabricated to cover the anode pulling-out sections 4. Subsequently, four pieces of anodes are welded together by a YAG laser irradiated from above the terminal member 9b, penetrating the anode pulling-out sections 4 of the stacked capacitor elements 1 to form a laminated unit 10. The connection of the four anodes does not have to be provided by penetrating the center of the anode section as shown in FIG. 2. The connection can be made by welding the sides of the anodes of the laminated elements by a laser.

Figure 3:
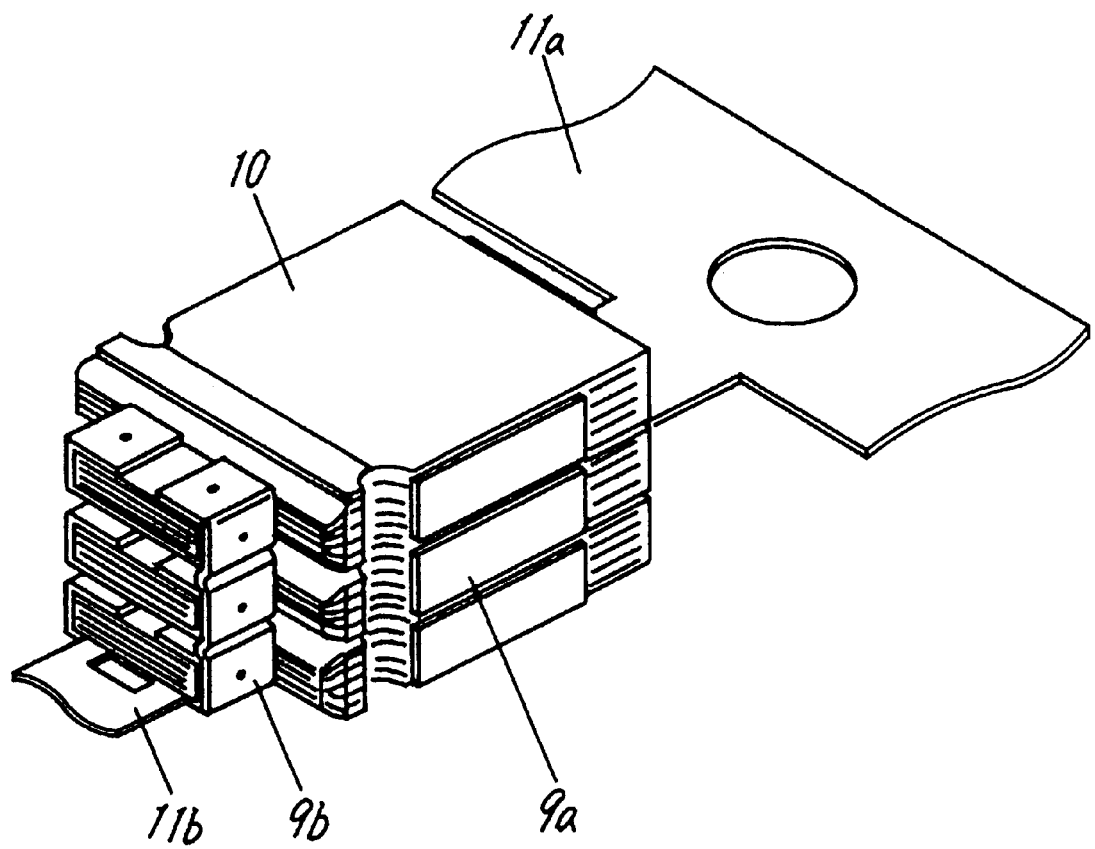
FIG. 3 illustrates a perspective view of the construction of a solid electrolytic capacitor in accordance with the first embodiment of the present invention.

The terminal member 9a made in a manner described above is electrically connected to a comb terminal 11a for connecting element sections with conductive adhesive as shown in FIG. 3. Three laminated units 10 are stacked with the aid of epoxy resin based silver paste and cured by heat. The terminal members 9b of the laminated units 10 are electrically connected to a comb terminal 11b which is disposed opposite of the comb terminal 11a, by laser welding.

The whole laminated unit is coated by encapsulating resin (not illustrated), and aged. The comb terminals 11b and 11b are bent along the line of the encapsulating resin to generate a solid electrolytic capacitor with a rating of 6.3 V, 150 μF.

Second Embodiment

In this embodiment, solid electrolytic capacitors are produced by the same method as in the first embodiment. The only difference is that the number of the flat capacitor elements 1 is changed from two to ten when the laminated unit 10 is formed. The rating of the solid electrolytic capacitors are, according to the number of capacitor elements, 75 μF, 112 μF, 150 μF (as is the case with the first embodiment), 187 μF, 225 μF, 262 μF, 300 μF, 337 μF, and 375 μF at the voltage of 6.3 volts.

When more than 10 capacitor elements are stacked, the anode section is distorted and the capacitor elements 1 are severed, failing to achieve desirable electrostatic capacitance or resulting in a large amount of leakage current. Due to such problems, it is impossible to generate a solid electrolytic capacitor with more than 10 flat capacitor elements.

Figure 5:
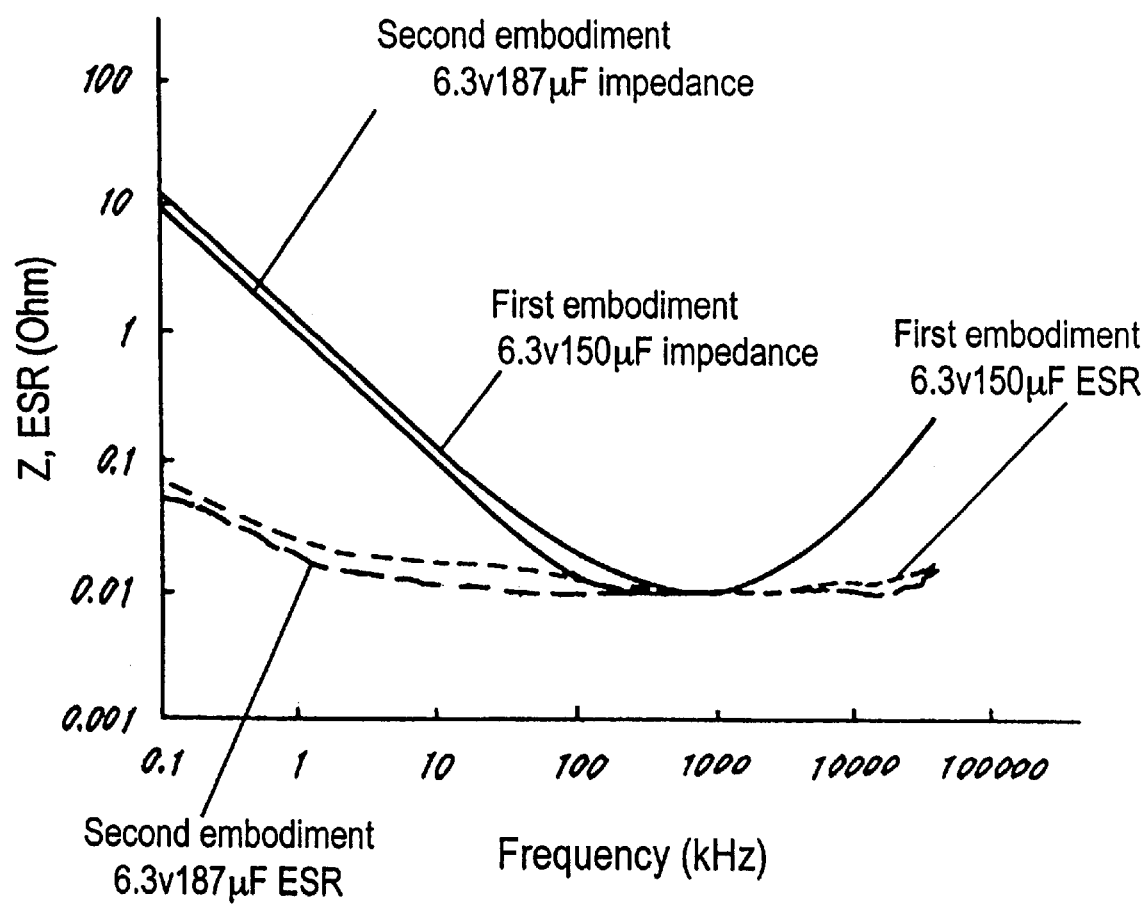
FIG. 5 is a chart illustrating the impedance and frequency characteristics of ESR of the solid electrolytic capacitor in accordance with the first and second embodiments of the present invention.

FIG. 5 shows the result of the measurement made on the impedance and frequency characteristics of the solid electrolytic capacitor of the first and second embodiments.

As FIG. 5 indicates, the solid electrolytic capacitors of the present invention have large capacitance and idealistic impedance and low ESR characteristics.

Laser welding is taught in the first and second embodiments. However, other welding methods can also be applicable to the practice of this invention.

Third Embodiment

Three laminated units 10 produced by the same method described in the first embodiment are stacked by providing epoxy resin based silver paste between element sections 3. The anode pulling-out sections 4 of the laminated units 10 are electrically connected by providing epoxy resin based silver paste between the comb terminals 11b and the terminal members 9b and curing it by heat. The whole units are encapsulated with encapsulating resin (not illustrated) and aged. The comb terminals 11a and 11b are bent along the encapsulating resin to produce a solid electrolytic capacitor with a rating of 6.3 V, 150 μF. As described in this embodiment, the anode sections can be bonded with conductive adhesive.

Fourth Embodiment

Figure 4:
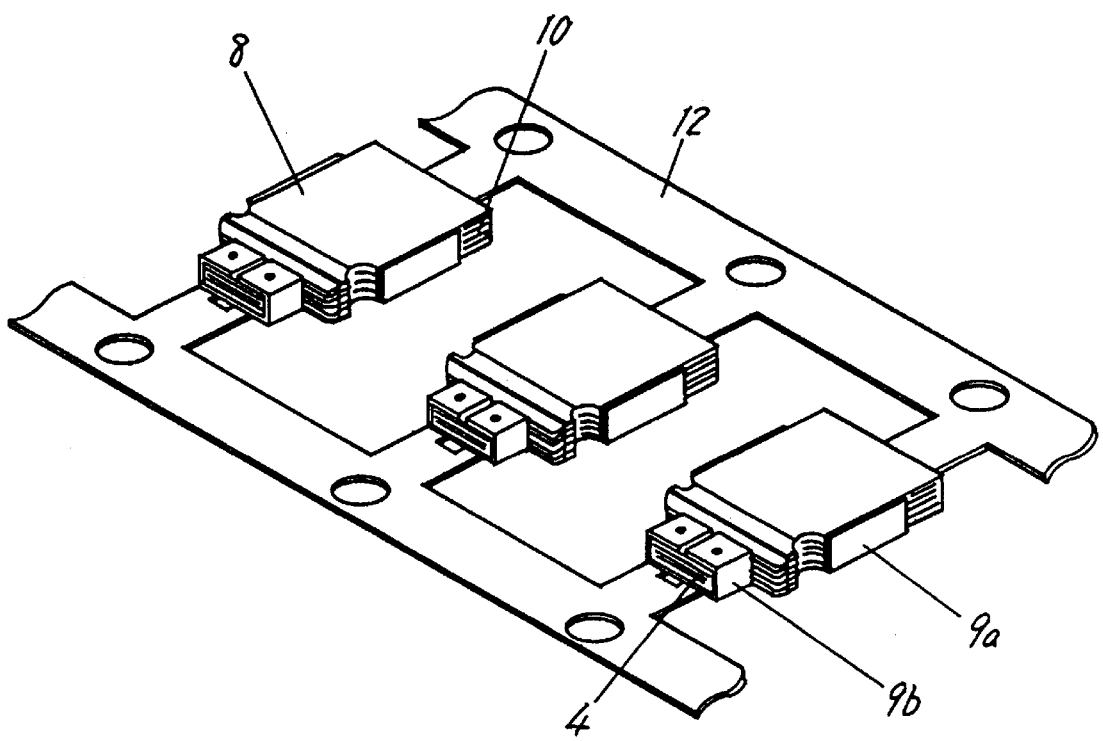
FIG. 4 illustrates a perspective view of the construction of a laminated unit formed as a continuous hoop in accordance with a fourth embodiment of the present invention.

As FIG. 4 shows, after the element sections 3 are coated with silver paste, the flat capacitor elements 1 are stacked to a continuous hoop lead frame 12 such that the element sections 3 are facing each other. The lead frame 12 is a belt-shaped metallic frame which has continuously arranged wide protruding terminals on the locations corresponding to the anode pulling-out sections 4 and the element sections 3. The layered element 8 is formed by stacking four pieces of anode pulling-out sections 4 on top of the other. The terminal members 9b are fabricated to cover the anode pulling-out sections 4. Then, four pieces of anode pulling-out sections 4 of the capacitor elements 1 are laser welded by a irradiation from above the terminal member 9b, to form the four-layered laminated unit 10.

Of the lead frame 12 having the laminated units 10 thereon, only the parts of the laminated units 10 are cut out to obtain independent laminated units 10 with metallic terminal members 9a and 9b. Subsequently, two independent laminated units 10 are bonded on the laminated unit 10 disposed on the lead frame 12 with silver paste, to form a twelve-layered solid electrolytic capacitor on the continuous lead frame 12 as shown in FIG. 3.

The whole unit is then encapsulated with encapsulating resin (not illustrated) and aged. The terminals are bent along the face of encapsulating resin to complete the manufacturing process of a solid electrolytic capacitor with a rating of 6.3 V, 150 µF.

In this embodiment the lead frames 12 of the same shape are used for producing the laminated unit 10 and the capacitor element 1. However, the shape of the lead frame 12 as taught above may be modified without deviating from the spirit of the invention. In the above explanation, conductive adhesive is used to connect the terminal members 9a and 9b, when the laminated units 10 are stacked. However, laser welding can be used to connect the terminal members without adversely affecting the effectiveness of this invention.

In the location of the terminal member 9b, a connecting element can also be provided separately from the laminated unit 10 to connect anodes.

Fifth Embodiment

FIGS. 6 through 11 show detailed description of connecting the anode pulling-out sections 4 of each laminated unit 10 when three laminated units 10 are stacked in this embodiment.

Figure 6:
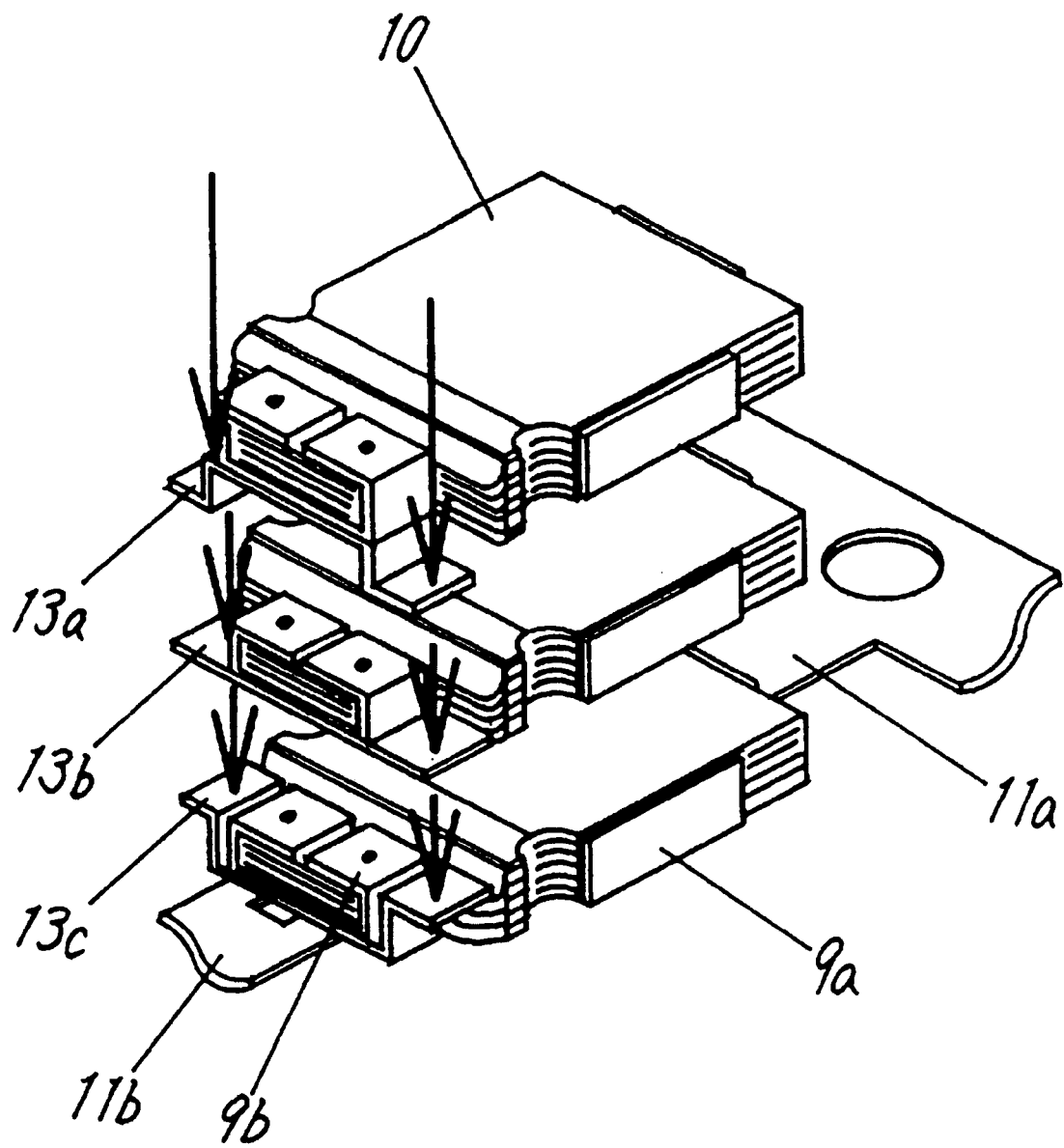
FIG. 6 illustrates a perspective view of the construction of the solid electrolytic capacitor in accordance with a fifth embodiment of the present invention.

In FIG. 6, connecting elements 13a, 13b and 13c are provided on the bottom surface of each terminal member 9b of the top, middle and bottom laminated units 10. The connecting elements 13a, 13b and 13c can be connected to the bottom surface of the terminal member 9b by laser welding or resistance welding. The terminal 9b can be bent to give it a shape illustrated in FIG. 6. The connecting elements 13a, 13b and 13c are layered at the tip when the top, middle and bottom laminated units are stacked. In this state, the layered potions of the connecting elements 13a, 13b and 13c can be electrically connected by laser welding as indicated by arrows in the FIG. 6, thereby connecting the anode pulling-out sections 4.

Figure 7:
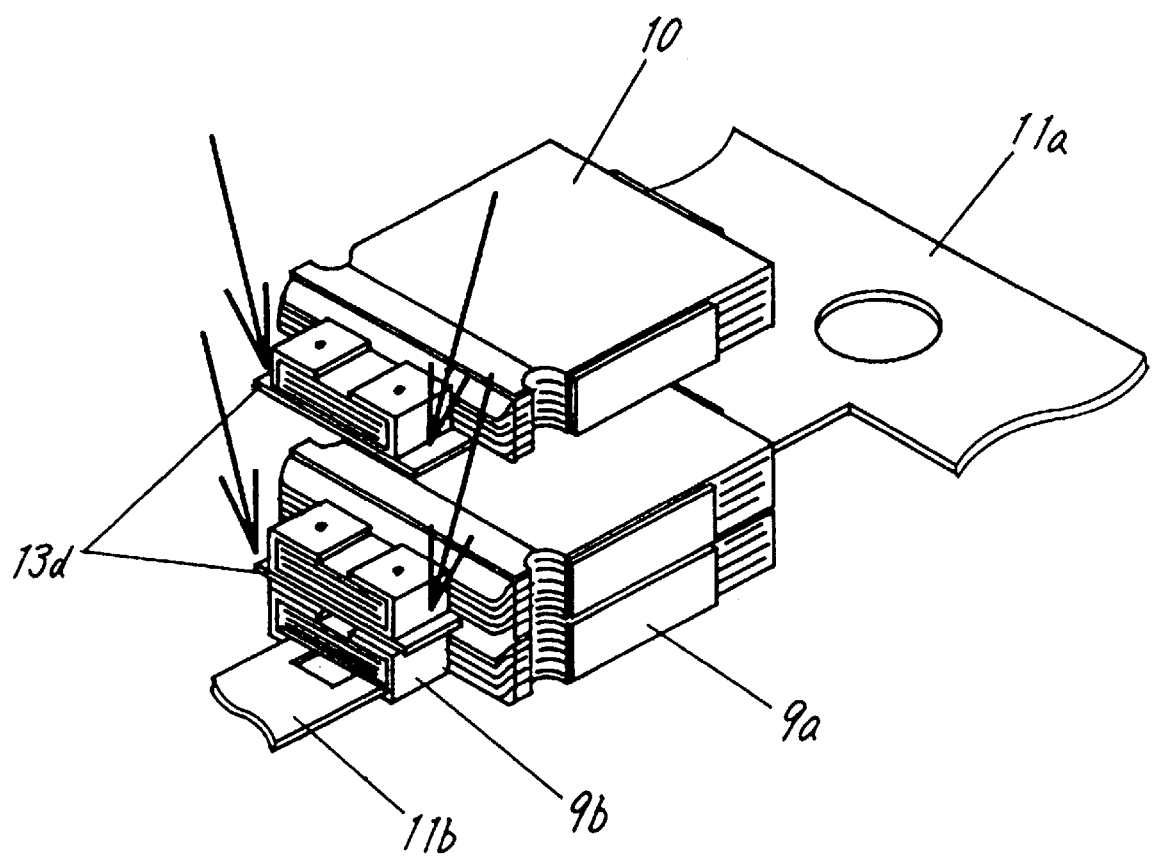
FIG. 7 illustrates a perspective view of the construction of the solid electrolytic capacitor in accordance with the fifth embodiment of the present invention.

In FIG. 7, connecting elements 13d are provided to the bottom surface of the top and middle terminal members 9b. The connecting elements 13d are connected to the bottom surface of the terminal members 9b by laser welding or resistance welding, or electrically connected to the terminal members 9b by bending them to provide the shape shown in FIG. 7. The connecting elements 13d function as spacers to fill the gap between the top, middle and bottom capacitor element laminated units 10 when they are stacked. The connecting elements 13d and the terminal member 9b at the bottom are electrically connected by laser welding provided from above diagonally as arrows in FIG. 7 indicate. This process of laser welding connects the anode pulling-out sections 4 with each other.

Figure 8:
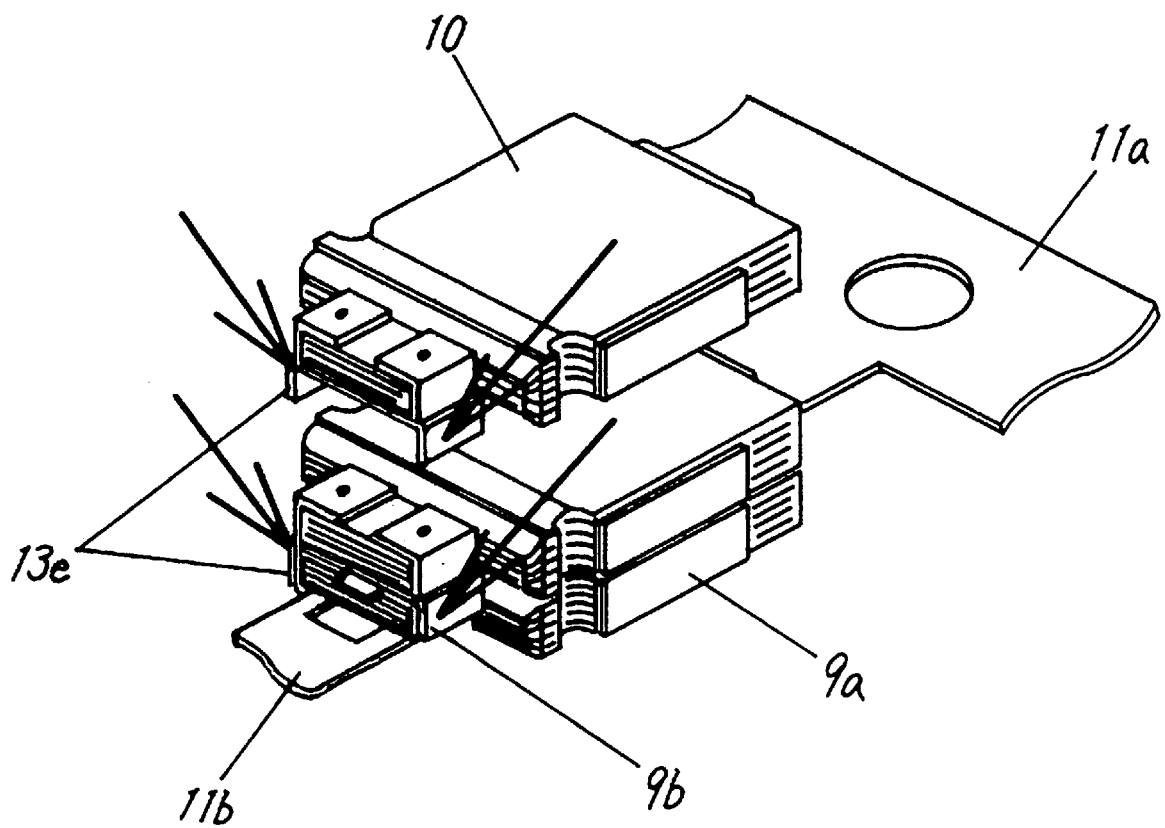
FIG. 8 illustrates a perspective view of the construction of the solid electrolytic capacitor in accordance with the fifth embodiment of the present invention.

In FIG. 8, connecting elements 13e are provided to the bottom surface of the top and middle terminal members 9b. The connecting elements 13e are connected to the bottom surface of the terminal members 9b by laser welding or resistance welding, or electrically connected to the terminal members 9b by bending them to provide the shape shown in FIG. 8. When the top, middle and bottom laminated units 10 are stacked, the connecting element 13e at the top sandwiches the terminal member 9b in the middle from the side. Likewise, the connecting element 13e in the middle sandwiches the terminal member 9b at the bottom from the side. In this state, the connecting elements 13e are welded by a laser irradiated from above diagonally or from the side to electrically connecting them to the middle and bottom terminal members 9b, thereby connecting the anode pulling-out sections 4 with each other.

Figure 9:
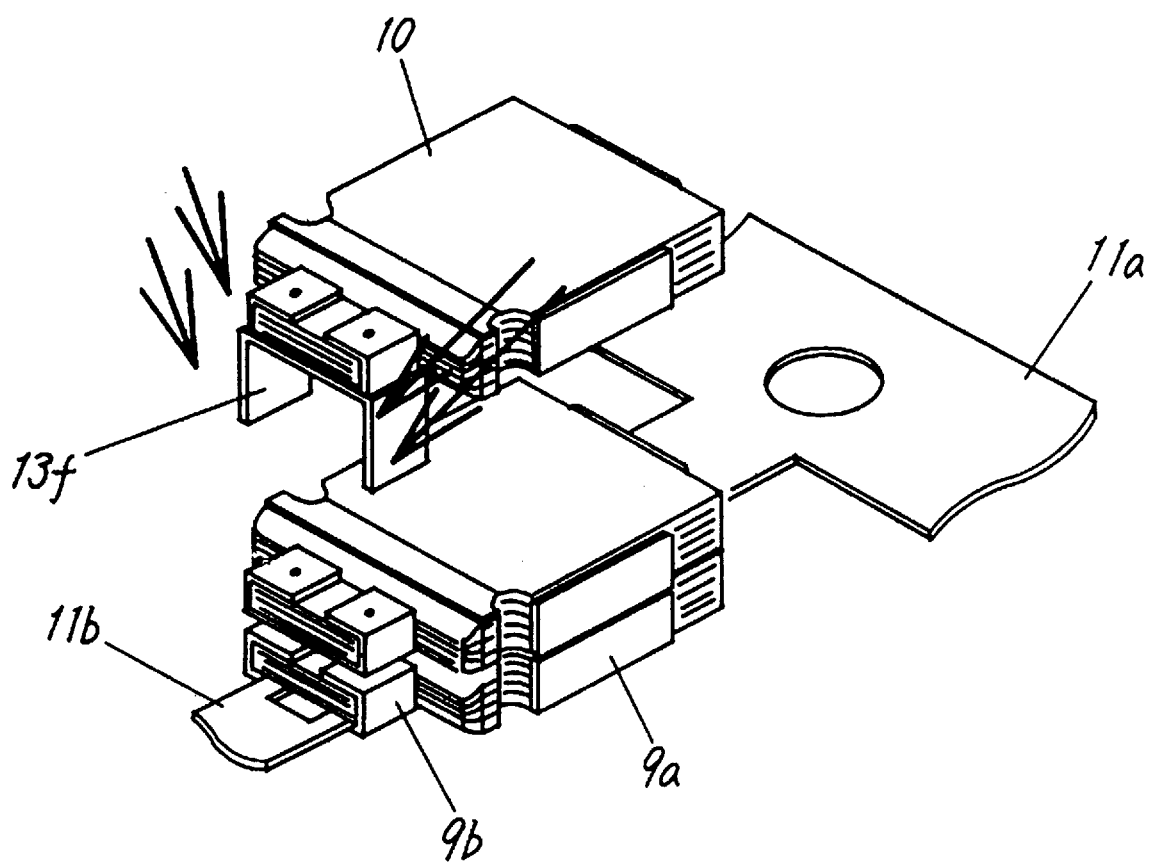
FIG. 9 illustrates a perspective view of the construction of the solid electrolytic capacitor in accordance with the fifth embodiment of the present invention.

In FIG. 9, connecting element 13f is provided to the bottom surface of the top terminal member 9b. The connecting element 13f is connected to the bottom surface of the terminal members 9b by laser welding or resistance welding, or electrically connected to the terminal member 9b by bending it to provide the shape shown in FIG. 9. When the top, middle and bottom laminated units 10 are stacked, the connecting element 13f at the top sandwiches the middle and bottom terminal member 9b. In this state, the connecting element 13f is welded by a laser irradiated from above diagonally or from the side to electrically connecting it to the middle and bottom terminal members 9b, thereby connecting the anode pulling-out sections 4 with each other.

Figure 10:
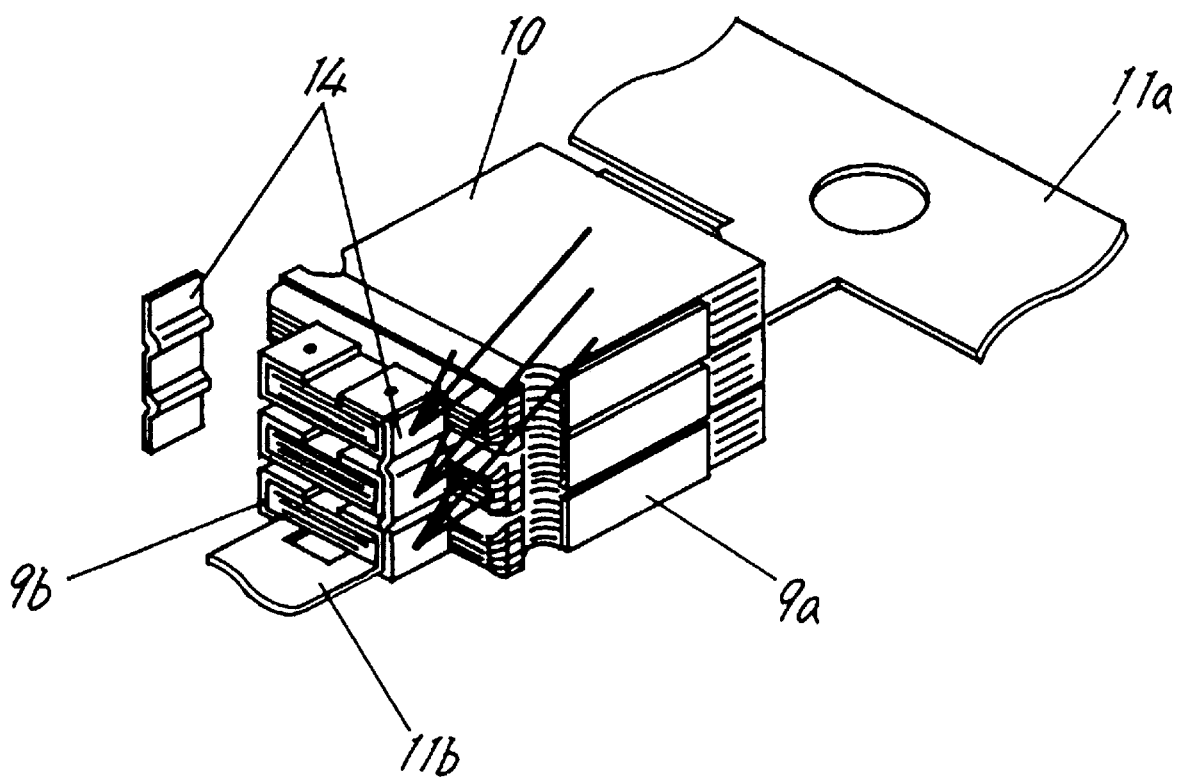
FIG. 10 illustrates a perspective view of the construction of the solid electrolytic capacitor in accordance with the fifth embodiment of the present invention.

In FIG. 10, connecting elements 14 are disposed to the sides of the terminal members 9b. The connecting elements 14 are then welded by a laser irradiated from above diagonally or from the side as indicated by arrows in FIG. 10. By the laser welding, the connecting elements 14 are electrically connected to the top, middle and bottom terminal members 9b, thereby connecting the anode pulling-out sections 4 of each laminated unit 10 with each other. The connecting elements 14 are desirably provided with two protrusions so that positioning can be conducted using the space between top and middle as well as middle and bottom terminal members 9b.

Figure 11:
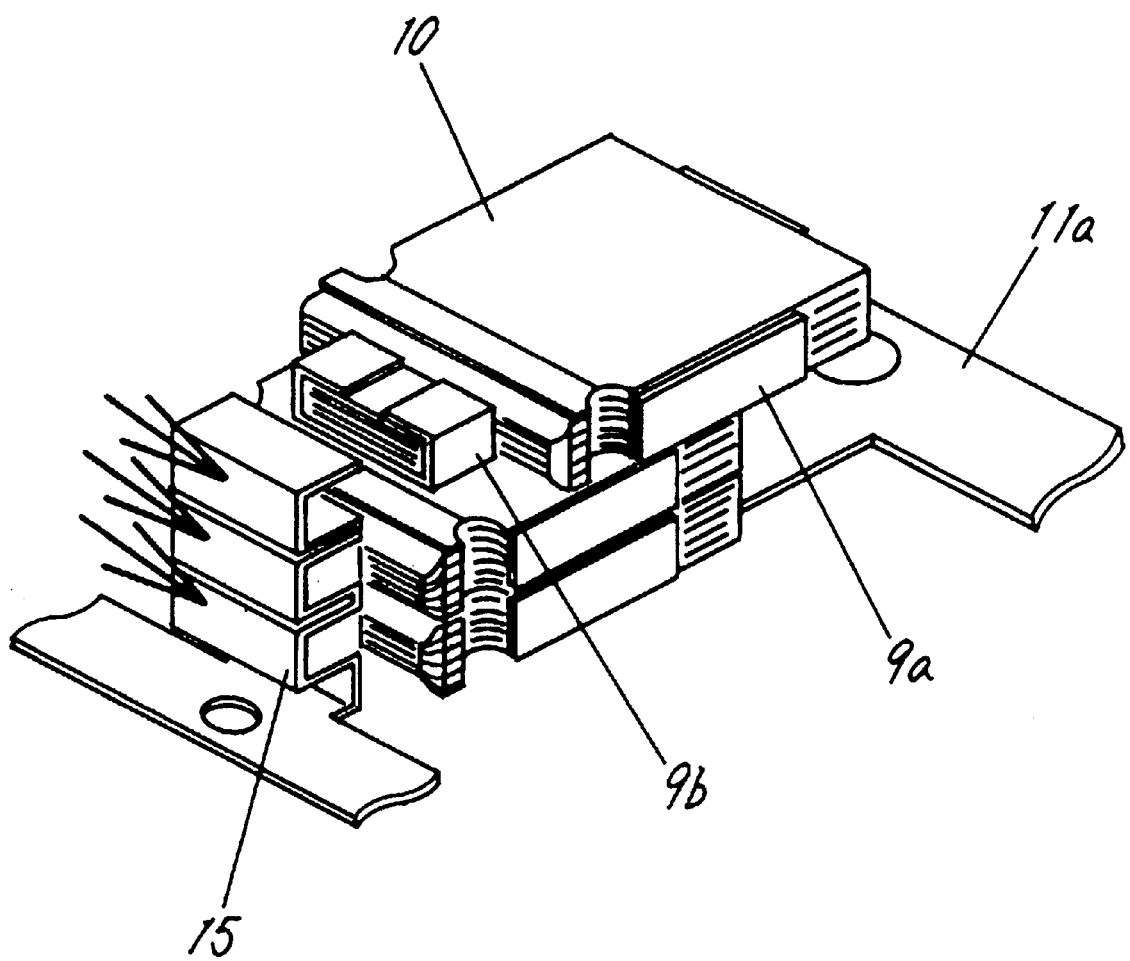
FIG. 11 illustrates a perspective view of the construction of the solid electrolytic capacitor in accordance with the fifth embodiment of the present invention.

In FIG. 11, connecting elements 15 are inserted from the front of the terminal members 9b. In this state, the connecting elements 15 are welded by a laser irradiated from above diagonally or from the side to electrically connecting them to the top and middle terminal members 9b, thereby connecting the anode pulling-out sections 4 to each other. In this case, it is difficult to provide the comb terminal 11b. Therefore, the connecting elements 15 are desirably hoop-shaped to secure stable supply of the laminated unit 10.

In the present invention, the laminated unit comprising at least more than one plate capacitor element which use conductive polymer as solid electrolyte, are connected parallel to each other on a single lead frame. ESR at high frequencies can be reduced, inversely proportional to the number of the stacked laminated units. Moreover, the total capacitance of the layered capacitor elements equals the capacitance of the solid electrolytic capacitor. Thus, the present invention provides a solid electrolyte capacitor of a large capacitance and a low ESR without expanding it's surface mounting area in a device.

What is claimed is:

1. A solid electrolytic capacitor comprising:
    at least two capacitor element laminated units each unit comprising:
        a capacitor element having a metallic electrode body,
        a dielectric oxide film layer formed on the body,
        a conductive polymer solid electrolyte conductive polymer on the oxide film layer,
        a cathode conductive layer on the solid electrolyte; and
        a pull-out anode section comprising an uncoated portion of the metallic electrode body; and
        a metallic terminal member connected to and covering the pull-out section; and
        a connection means for connecting the units.

2. The solid electrolytic capacitor as set forth in claim 1 wherein each electrode is electrically connected after at least two of said laminated units are stacked, and all of said laminated units are molded a with molding resin.

3. The solid electrolytic capacitor as set forth in one of claims 1 and 3, wherein each electrode of said laminated units is connected using connecting elements.

4. The solid electrolytic capacitor as set forth in claim 3, wherein the connecting elements are selected from one of:

(a) conductive adhesive;

(b) an integral-type conductive material which is connected to all the electrodes; and (c) a separate-type conductive material which is connected to each corresponding electrode of said laminated unit.

5. The solid electrolytic capacitor as set forth in claim 4, wherein spacers are provided in a gap between the electrodes of each capacitor units, said gap being created when said laminated units are stacked.

6. The solid electrolytic capacitor as set forth in one of claims 1 and 3, wherein spacers are provided in a gap between the electrodes of each capacitor unit, said gap being created when said laminated units are stacked.

7. The solid electrolytic capacitor as set forth in claim 4, wherein spacers are provided in a gap between the electrodes of each capacitor units, said gap being created when said laminated units are stacked.

8. The solid electrolytic capacitor as set forth in claim 3, wherein said connecting elements are integrally formed with the metallic terminal member.

9. The solid electrolytic capacitor as set forth in claim 8, wherein the metallic terminal member integrally formed with the connecting element is provided like a hoop at predetermined intervals.

* * * * *